(12) United States Patent
Yamaoka et al.

(10) Patent No.: US 6,869,141 B2
(45) Date of Patent: Mar. 22, 2005

(54) CHILD SEAT MOUNTING STRUCTURE

(75) Inventors: Daisuke Yamaoka, Utsunomiya (JP); Muneatsu Minato, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/640,526

(22) Filed: Aug. 13, 2003

(65) Prior Publication Data

US 2004/0041450 A1 Mar. 4, 2004

(30) Foreign Application Priority Data

Aug. 29, 2002 (JP) ........................................ 2002-251352

(51) Int. Cl.⁷ ............................. A47C 1/08; A47D 1/10; B60N 2/42; B60R 21/02
(52) U.S. Cl. ...................................... 297/253; 297/254
(58) Field of Search ................................. 297/253, 254

(56) References Cited

U.S. PATENT DOCUMENTS

| | | | | |
|---|---|---|---|---|
| 5,941,600 A | | 8/1999 | Mar et al. ................. | 297/250.1 |
| 6,095,604 A | * | 8/2000 | Stack et al. .................. | 297/254 |
| 6,267,441 B1 | * | 7/2001 | Otero .......................... | 297/254 |
| 6,267,442 B1 | * | 7/2001 | Shiino et al. ............... | 297/254 |
| 6,517,154 B2 | * | 2/2003 | Sawamoto .............. | 297/254 X |
| 6,554,357 B2 | * | 4/2003 | Moffa ......................... | 297/253 |
| 6,729,687 B2 | * | 5/2004 | Haverkamp .................. | 297/254 |
| 6,736,456 B2 | * | 5/2004 | Okamoto et al. ........ | 297/254 X |
| 2002/0000744 A1 | * | 1/2002 | Maciejczyk .................. | 297/254 |
| 2002/0043830 A1 | * | 4/2002 | Sawamoto ............. | 297/216.11 |
| 2003/0132654 A1 | * | 7/2003 | Okamoto et al. ............ | 297/331 |
| 2003/0151281 A1 | * | 8/2003 | Williams ................ | 297/254 X |
| 2003/0184138 A1 | * | 10/2003 | Haverkamp .................. | 297/254 |
| 2004/0032154 A1 | * | 2/2004 | Menon et al. .............. | 297/253 |
| 2004/0051356 A1 | * | 3/2004 | Neelis ......................... | 297/253 |
| 2004/0084939 A1 | * | 5/2004 | Boyle ......................... | 297/253 |

FOREIGN PATENT DOCUMENTS

| | | |
|---|---|---|
| DE | 198 27 658 | 12/1999 |
| JP | 07-061268 | 3/1995 |
| JP | 2002-104132 | 4/2002 |
| JP | 2004-90895 | 3/2004 |
| JP | 2004-114917 | 4/2004 |

* cited by examiner

Primary Examiner—Rodney B. White
(74) Attorney, Agent, or Firm—Merchant & Gould P.C.

(57) ABSTRACT

A child seat mounting structure in which a child seat can be easily mounted. The child seat mounting structure includes a seat which is installed in a vehicle body, and which has a seatback, a headrest which is mounted on the top of the seatback, and which has a through hole formed therein, and a child seat which is mounted on the seat, and which has a top tether extending from the top thereof for fixing the child seat. The top tether extends backward through the through hole and beyond the seatback, and the end of the top tether is engaged with a portion of the seat or a portion of the vehicle body.

2 Claims, 4 Drawing Sheets

CHILD SEAT MOUNTING STRUCTURE

BACKGROUND OF THE INVENTION

1. Field of the Invention

The present invention relates to a child seat mounting structure in which a child seat is mounted on a seat of a vehicle.

2. Description of the Related Art

Japanese Unexamined Patent Application, First Publication No. 2002-104132 discloses an example of child seat mounting structures in which a child seat is mounted on a seat of a vehicle. According to the above disclosure, a child seat, which is to be mounted on a rear seat, has a top tether at the top portion thereof. In a mounted state, the top tether extends backward beyond a seatback of the rear seat, and is engaged with a tether anchor of an anchor plate that is fixed to a rear side panel of a vehicle body. Japanese Unexamined Patent Application, First Publication No. Hei 07-61268 discloses another example of mounting structures in which, in order to mount a child seat on a seat of a vehicle, a top tether of the child seat is engaged with the backside of a seatback of the seat while being extended beyond the seatback.

In an operation for fixing the top tether of the child seat to the seat or the vehicle body beyond the seatback as disclosed in the above-mentioned patent documents, a headrest of the seat, which is mounted on the high seatback, may be disposed across the routing path of the top tether, and may interrupt the operation; therefore, the headrest may have to be removed in order to lead the top tether backward, whereby the operation for mounting the child seat becomes complex.

SUMMARY OF THE INVENTION

In view of the above circumstances, an object of the present invention is to provide a child seat mounting structure in which the child seat can be easily mounted.

In order to achieve the above object, the present invention provides a child seat mounting structure: including a seat which is installed in a vehicle body, and which has a seatback; a headrest which is mounted on the top of the seatback, and which has a through hole formed therein; and a child seat which is mounted on the seat, and which has a top tether extending from the top thereof for fixing the child seat, wherein the top tether extends backward through the through hole and beyond the seatback, and the end of the top tether is engaged with a portion of the seat or a portion of the vehicle body.

According to the child seat mounting structure of the present invention, the top tether of the child seat extends backward beyond the seatback while passing through the through hole formed in the headrest of the seat on which the child seat is mounted, and the end of the top tether is engaged with a portion of the seat or a portion of the vehicle body. The headrest need not be removed during a mounting operation for the child seat even when the headrest is disposed across the path of the top tether. In addition, the through hole prevents the top tether from shifting in the lateral direction, i.e., the through hole acts as a guide for the top tether.

In the child seat mounting structure of the present invention, the headrest may be supported by a cross member that is included in the vehicle body.

Accordingly, because the headrest is supported by the cross member, a load applied to the child seat may be supported by the cross member via the top tether and the headrest.

In the child seat mounting structure of the present invention, the top tether may be engaged with the cross member.

Accordingly, because the top tether is engaged with the cross member, a load applied to the child seat may be supported by the cross member via the top tether and the headrest.

In the child seat mounting structure of the present invention, the top portion of the seatback may be sandwiched between the headrest and the cross member.

In the child seat mounting structure of the present invention, the top portion of the seatback may be sandwiched between the headrest and the cross member.

Accordingly, because the top portion of the seatback is sandwiched between the headrest and the cross member, the posture of the seatback may be stabilized, and thus the position of the child seat may also be stabilized.

DESCRIPTION OF THE PREFERRED EMBODIMENTS

An embodiment of a child seat mounting structure according to the present invention will be explained below with reference to the appended drawings.

Figure 1:
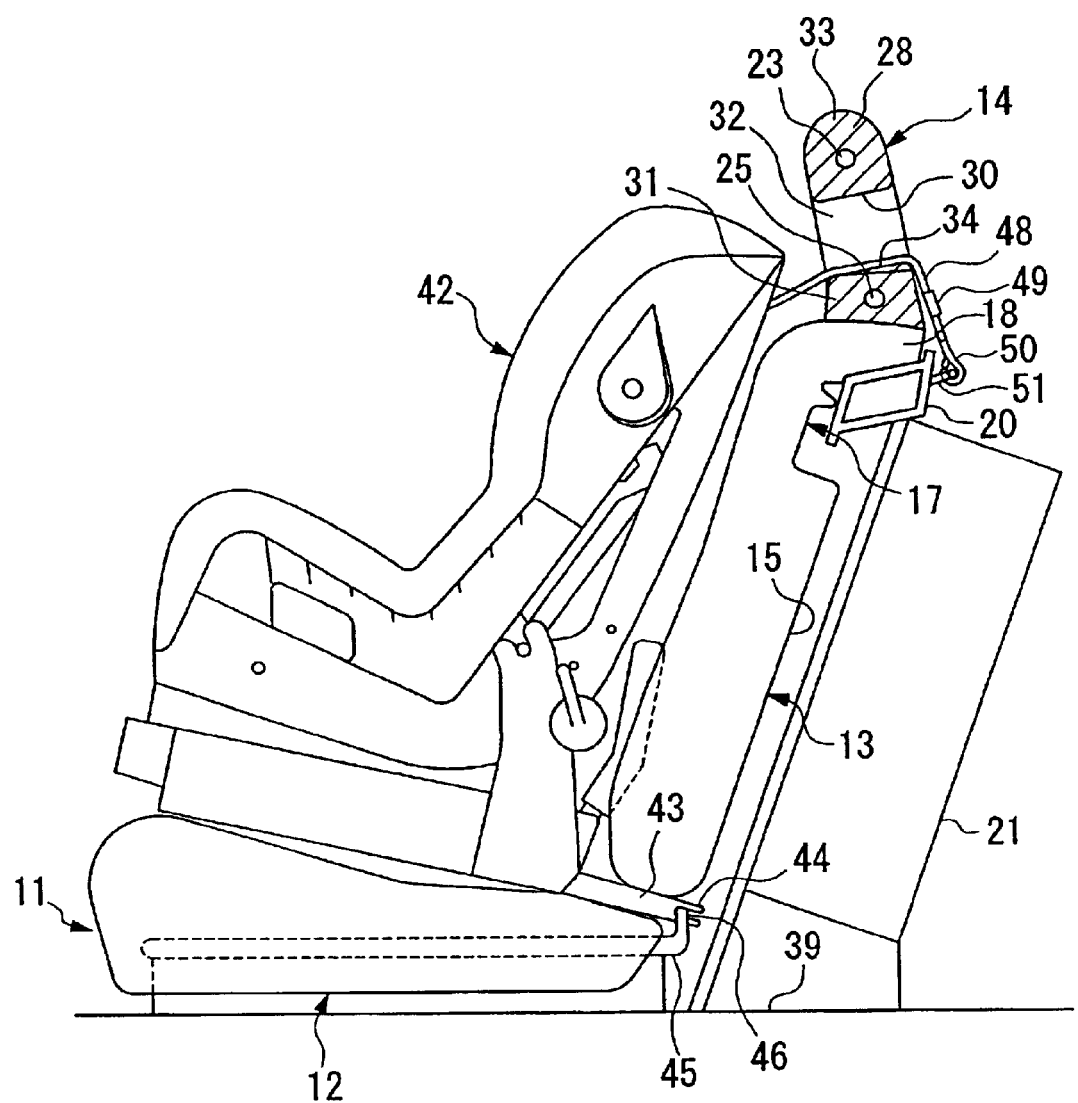
FIG. 1 is a side view showing an embodiment of a child seat mounting structure according to the present invention.

In this embodiment, the child seat mounting structure is applied to a rear seat 11 of a vehicle. As shown in FIG. 1, the rear seat 11 includes a seat cushion 12 on which a passenger is seated, a seatback 13 which is provided at the rear end of the seat cushion 12 so as to extend while being slightly slanted in order to support the back of the passenger and a headrest 14 which is provided on the top of the seatback in order to support the head of the passenger.

In a backface 15 of the seatback 13 of the rear seat 11, there is formed a groove 17 which is concave toward the front of the vehicle while extending in the right-to-left direction. Accordingly, at an upward position with respect to the groove 17, there is formed a projecting portion 18 which projects backward from the bottom of the groove 17 while extending in the right-to-left direction. A cross member 20, which is one of the structural members for forming the body of the vehicle, extends in the right-to-left direction while a portion thereof is disposed in the groove 17. Accordingly, the projecting portion 18 is placed on the cross member 20. The ends of the cross member 20 are respectively connected to rear suspension mounting portions that are disposed in the right and left sides of the vehicle body. In the case of a hybrid vehicle or a fuel-cell powered vehicle, for example, the cross member 20 is provided for supporting a secondary power source 21 such as a capacitor or the like in the back space as viewed from the rear seat 11.

Figure 2A:
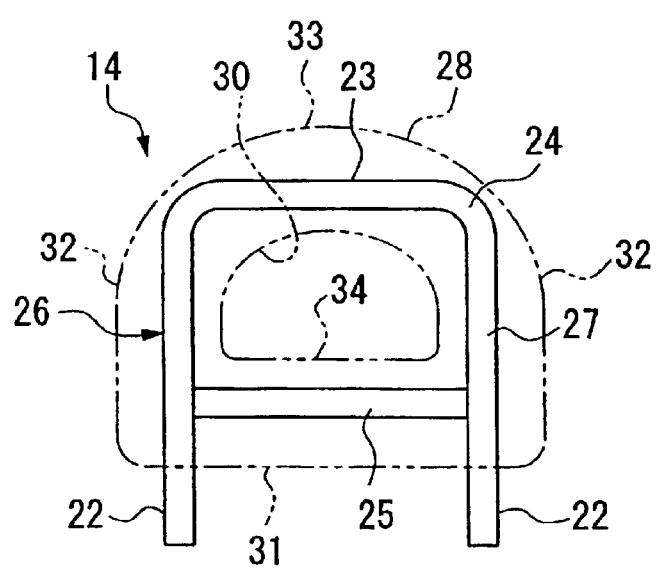
FIG. 2A is a front view showing a headrest included in the embodiment of the child seat mounting structure according to the present invention.
Figure 2B:
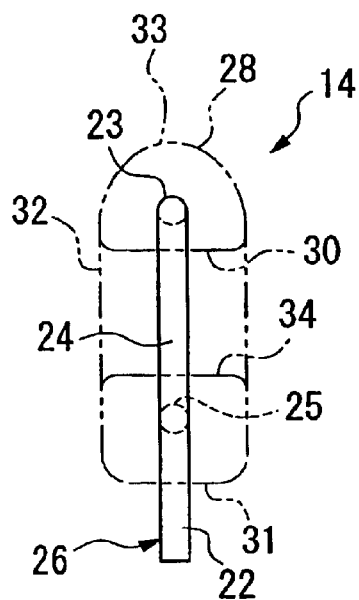
FIG. 2B is a side view showing the headrest.

As shown in FIG. 2, the headrest 14 includes a headrest frame 26 having frame members 24 and 25, and cushion 28.

The frame member 24, which has bends therein, includes a pair of leg segments 22 which are disposed in parallel to each other, and a connecting segment 23 which extends so as to connect respective ends of the pair of leg segments 22 to each other. The frame member 25 connects the pair of leg segments 22 to each other while extending in parallel to the connecting segment 23. The cushion 28 is provided so as to cover the headrest frame 26. More specifically, the cushion 28 covers a rectangular frame segment 27 which includes portions of the pair of leg segments 22 of the frame member 24, the portions being disposed adjacent to the connecting segment 23, the connecting segment 23, and the frame member 25.

The cushion 28 has a through hole 30 extending in the front-to-rear direction. The through hole 27 is positioned at the middle of the inside of the rectangular frame segment 27. If the through hole 30 is formed in a shape that matches the shape of a tether anchor 51, which will be explained later, a guiding effect for a top tether 48, which will also be explained later, will be improved. The cushion 28, which is formed in a D-frame shape, includes a base segment 31 extending in the right-to-left direction, a pair of vertically extending segments 32 each of which extends from the end of the base segment 31, and a bridge segment 33 extending in the right-to-left direction so as to connect the upper ends of the pair of vertically extending segments 32 to each other. The upper surface 34 of the base segment 31 is formed as a substantially flat surface.

Figure 3:
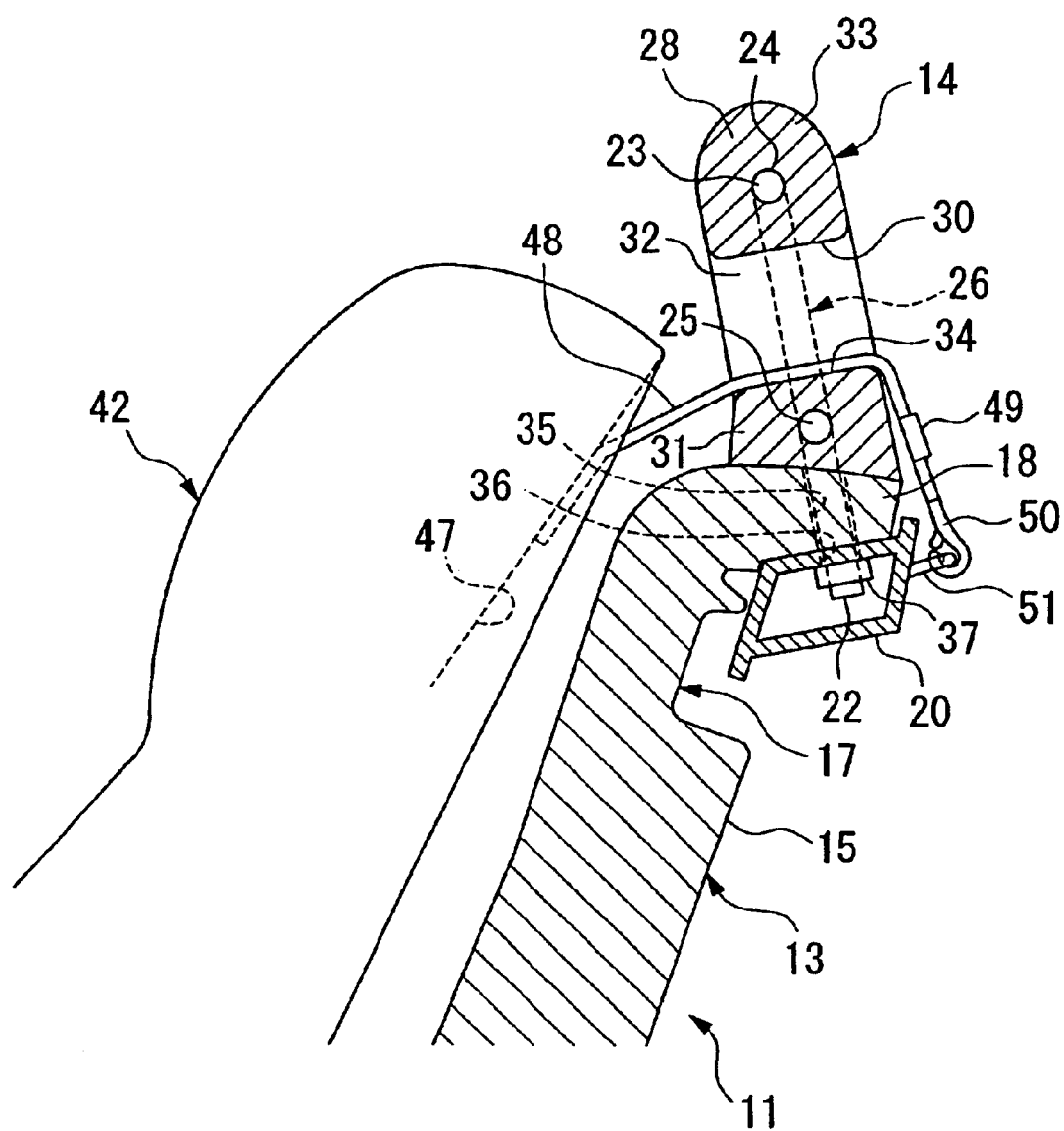
FIG. 3 is an enlarged cross-sectional view showing the main portion of the embodiment of the child seat mounting structure according to the present invention.

As shown in FIG. 3, the headrest 14 is fixed to the cross member 20 using fixing elements 37 in such a manner that the pair of leg segments 22 projecting from the cushion 28 are disposed through penetrating holes 35 that are formed in the projecting portion 18 of the seatback 13 of the rear seat 11 so as to vertically penetrate the projecting portion 18, and the pair of leg segments 22 are disposed through engagement holes 36 that are formed in the cross member 20. In a state in which the headrest 14 is fixed to the cross member 20 as described above, the projecting portion 18 is held between the headrest 14 and the cross member 20.

In this embodiment, as shown in FIG. 1, the above-mentioned secondary power source 21, which is supported by the cross member 20 while being placed on a vehicle body floor 39, is disposed in a space behind the backface 15 of the seatback 13 and directly under the cross member 20.

As shown in FIG. 1, a child seat 42, which is mounted on the rear seat 11 configured as explained above, has, at the bottom thereof, a pair of rods 43 extending backward in a direction along which the bottom surface of the child seat 42 extends. Each of the rods 43 is provided with a locking mechanism 44 at the end thereof. The bottom portion of the child seat 42 is fixed in such a manner that the pair of rods 43 are disposed in a gap between the seat cushion 12 and the seat back 13, and the locking mechanisms 44 respectively provided at the ends of the pair of rods 43 engage a locking portion 46 of a seat frame 45 of the seat cushion 12.

As shown in FIG. 3, an end of the top tether 48 is fixed to a backface 47 of the child seat 42 in the top portion of the child seat 42. The top tether 48 is provided with an engagement portion 50 at the other end thereof, and is configured such that the overall length thereof is adjustable by moving a length adjusting portion 49 provided in the middle thereof.

On a portion of the cross member 20 opposite to the rear seat 11, there is fixed the tether anchor 51, formed in a substantially U-shape, to which the engagement portion 50 of the top tether 48 is made engageable. The position of the tether anchor 51 in terms of the right-to-left direction is matched with that of the through hole 30 formed in the headrest 14.

Next, a mounting operation for the child seat 42 will be explained.

As shown in FIG. 1, the child seat 42 is placed on the seat cushion 12 while the rods 43 extending backward from the bottom of the child seat 42 are inserted in the gap between the seat cushion 12 and the seatback 13 of the rear seat 11, and the locking mechanisms 44 respectively provided at the ends of the rods 43 engage the locking portion 46 of the seat frame 45. As a result, the bottom portion of the child seat 42 is fixed to the rear seat 11.

Once the child seat 42 has been placed on the seat cushion 12 of the rear seat 11 as described above, the top tether 48 provided on the top portion of the child seat 42 is led beyond the seatback 13 of the rear seat 11, and the engagement portion 50 of the top tether 48 is engaged with the tether anchor 51 provided on the cross member 20. In the above operation, as shown in FIG. 3, the top tether 48 is inserted toward the back into the through hole 30 formed in the headrest 14 of the rear seat 11 while being prevented from twisting.

Figure 4:
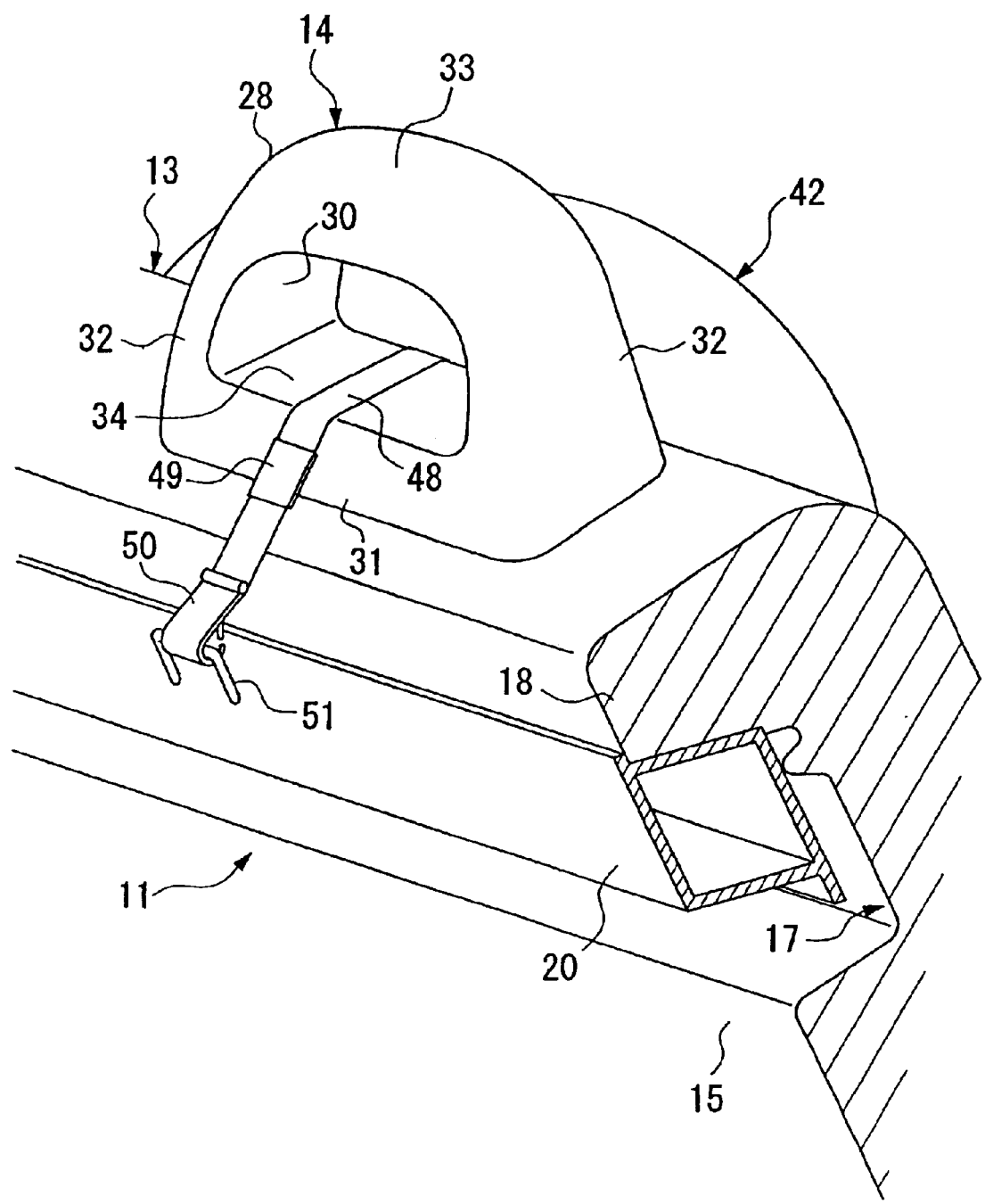
FIG. 4 is a partial cross-sectional and perspective view showing the main portion of the embodiment of the child seat mounting structure according to the present invention as viewed from the back of a seat.

As shown in FIG. 4, after the top tether 48 is led through the through hole 30 formed in the headrest 14 of the rear seat 11, and the engagement portion 50 of the top tether 48 is engaged with the tether anchor 51 as described above, tension is applied to the top tether 48 by moving or adjusting the length adjusting portion 49, and thus the child seat 42 is fixed to the rear seat 11 and to the cross member 20 as shown in FIG. 1.

In the child seat mounting structure according to the present embodiment explained above, the top tether 48 of the child seat 42 is led beyond the seatback 13 through the through hole 30 formed in the headrest 14 of the rear seat 11 on which the child seat 42 is placed, and the top tether 48 is engaged with the cross member 20 of the vehicle body. Accordingly, the child seat 42 can be preferably fixed to the rear seat 11 without removing the headrest 14. More specifically, even when the top tether 48 shifts in the right-to-left direction, the top tether 48 may be prevented from coming off the headrest 14 due to the vertically extending segments 32 of the headrest 14; therefore, the child seat 42 can be preferably fixed to the rear seat 11.

As explained above, because the headrest 14 need not be removed even when the headrest 14 of the rear seat 11 is disposed across the path of the top tether 48, the child seat 42 can be easily mounted.

Moreover, because the headrest 14 is supported by the cross member 20, a load applied to the child seat 42 can be transmitted to the cross member 20 via the top tether 48 and the headrest 14. As a result, the child seat 42 may be preferably supported by the cross member 20.

Furthermore, because the top tether 48 is engaged with the cross member 20 that supports the headrest 14, a load applied to the child seat 42 can be transmitted to the cross member 20 via the top tether 48. As a result, the child seat 42 may be more preferably supported by the cross member 20.

In addition, because the projecting portion 18 provided on the top portion of the seatback 13 is sandwiched between the cross member 20 and the headrest 14 that is supported by the cross member 20, the posture of the seatback 13 of the rear seat 11 may be stabilized, and thus the position of the child seat 42 may also be stabilized.

In the above description, the tether anchor 51 with which the top tether 48 engaged is provided on the cross member 20 of the vehicle body; however, the tether anchor 51 may be provided on another member of the vehicle body other than the cross member 20, and alternatively, the tether anchor 51 may be provided on the seatback 13 of the rear seat 11.

Advantageous Effects Obtainable by the Invention

As explained above, according to the child seat mounting structure of the present invention, the top tether of the child seat is led beyond the seatback through the through hole formed in the headrest of the seat on which the child seat is placed, and the top tether is engaged with the seat or the vehicle body. Therefore, the headrest need not be removed even when the headrest of the seat is disposed across the path of the top tether. Accordingly, the child seat can be easily mounted. In addition, the top tether is prevented from shifting in the right-to-left direction due to the through hole, i.e., the through hole acts as a guide for the top tether.

According to another child seat mounting structure of the present invention, because the headrest is supported by the cross member, a load applied to the child seat can be supported by the cross member via the top tether and the headrest.

According to another child seat mounting structure of the present invention, because the top tether is engaged with the cross member that supports the headrest, a load applied to the child seat can be supported by the cross member via the top tether.

According to another child seat mounting structure of the present invention, because the top portion of the seatback is sandwiched between the cross member and the headrest that is supported by the cross member, the posture of the seatback may be stabilized. As a result, the position of the child seat may be stabilized.

What is claimed is:

1. A child seat mounting structure of a vehicle seat and vehicle body for mounting a child seat to a vehicle comprising:

a vehicle seat installed in a vehicle body, and the vehicle seat including a seatback supported at a top portion thereof by a cross member structurally formed with the vehicle body; and a headrest mounted on a top of the seatback, the headrest including a cushion body, and a through hole formed through the cushion body; and the cross member cooperating with the through hole for mounting a child seat to the vehicle seat, such that the child seat is fixed to a bottom portion of the vehicle seat, and a top tether of the child seat extending from a top of the child seat, fixing the child seat to the vehicle seat, wherein the through hole enabling the top tether to extend backward through the through hole and beyond the seatback, and the cross member enabling an end of the top tether to engage with the cross member so as to apply a tension on the top tether to secure the child seat.

2. A child seat mounting structure of a vehicle seat and vehicle body for mounting a child seat to a vehicle according to claim 1, wherein the top portion of the seatback is sandwiched between the headrest and the cross member.

* * * * *